(12) United States Patent
Wakino

(10) Patent No.: US 9,298,656 B2
(45) Date of Patent: Mar. 29, 2016

(54) DATA TRANSFERRING APPARATUS AND DATA TRANSFERRING METHOD

(71) Applicant: CANON KABUSHIKI KAISHA, Tokyo (JP)

(72) Inventor: Shiori Wakino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 376 days.

(21) Appl. No.: 13/724,173

(22) Filed: Dec. 21, 2012

(65) Prior Publication Data

US 2013/0166779 A1    Jun. 27, 2013

(30) Foreign Application Priority Data

Dec. 26, 2011  (JP) ................... 2011-283300

(51) Int. Cl.
*G06F 13/38*    (2006.01)

(52) U.S. Cl.
CPC .................... *G06F 13/385* (2013.01)

(58) Field of Classification Search
None
See application file for complete search history.

(56) References Cited

U.S. PATENT DOCUMENTS

| 6,061,366 A * | 5/2000 | Seki et al. ............. 370/477 |
| 2003/0084226 A1* | 5/2003 | Barrenscheen et al. ...... 710/305 |
| 2003/0126339 A1* | 7/2003 | Barrenscheen ............ 710/305 |
| 2006/0120365 A1* | 6/2006 | Nishihara ............... 370/389 |
| 2008/0215781 A1* | 9/2008 | Lee et al. .............. 710/110 |

FOREIGN PATENT DOCUMENTS

| JP | 2002-247095 A | 8/2002 |
| JP | 2006-251923 A | 9/2006 |
| JP | 3829851 B | 10/2006 |
| JP | 2009-098799 A | 5/2009 |

* cited by examiner

*Primary Examiner* — Idriss N Alrobaye
*Assistant Examiner* — Dayton Lewis-Taylor
(74) *Attorney, Agent, or Firm* — Canon U.S.A., Inc. IP Division

(57) ABSTRACT

A data transferring apparatus includes a receiving unit configured to receive, from a plurality of bus masters, a data transfer request including attribute information indicating a data transfer type and an address and a sending unit configured to determine, based on information included in the data transfer request, whether the data transfer request is a target to be compressed and to, based in the determination, transfer the data transfer request with or without the attribute information and address.

16 Claims, 15 Drawing Sheets

FIG. 4

| Type | packet description | |
|---|---|---|
| 00 | first packet format | Read Request |
| 10 | second packet format | Read Request |
| 01 | first packet format | Write Request |
| 11 | second packet format | Write Request |

FIG. 14A

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| PACKET IDENTIFICATION | | | | Type | | LOCK | | CACHE | | | | PORT | | BURST | |
| SIZE | | | ID | | | | | RESERVE SPACE | | | | | | | |
| ADDRESS 0 | | | | | | | | | | | | | | | |
| ADDRESS 1 | | | | | | | | | | | | | | | |
| DATA 0 | | | | | | | | | | | | | | | |
| DATA 1 | | | | | | | | | | | | | | | |

DATA TRANSFERRING APPARATUS AND DATA TRANSFERRING METHOD

BACKGROUND OF THE INVENTION

1. Field of the Invention

Aspects of the present invention generally relate to a data transferring apparatus and a data transferring method.

2. Description of the Related Art

Techniques for transferring data by using packets are used in various fields. For example, Transmission Control Protocol/Internet Protocol (TCP/IP) is a technique for transferring data on the Internet on a packet basis. In addition, PCI EXPRESS® is a technique for transferring data between integrated circuits based on packets. In addition, Network On Chip (NoC) is a technique for transferring data in an integrated circuit on a packet basis. These packet basis data transferring techniques offer advantages. For example, various information necessary for transferring addresses and data can be transferred with a small number of signal lines, and the transfer rate can easily be increased. However, packet basis data transferring techniques require a larger number of cycles for transferring data than non-packet basis data transferring techniques. Thus, techniques for modifying a packet structure to increase the transfer efficiency have been discussed.

For example, Japanese Patent Application Laid-Open No. 2009-098799 discusses a technique for increasing the transfer efficiency. According to this technique, when a transmission side data transferring apparatus transfers data, if a bus transaction includes consecutive addresses, the data transferring apparatus packs a plurality of data as a single transfer unit (1 packet) for a single address. In this way, addresses and headers are omitted, so that the transfer efficiency is increased.

In addition, Japanese Patent No. 3829851 discusses technique in which a transmission side data transferring apparatus transmits a packet including an address automatic update mode, the number of updates, and a plurality of data, and a reception side data transferring apparatus generates an address while incrementing an address based on a value of the address automatic update mode.

If a plurality of bus masters access a bus slave via a single interface, since transactions from the plurality of bus master exist on the interface, addresses are less likely to be consecutive. Thus, it is difficult to increase the transfer efficiency according to conventional methods.

SUMMARY OF THE INVENTION

According to an aspect of the present invention, a data transferring apparatus includes a receiving unit configured to receive, from a plurality of bus masters, a data transfer request including attribute information indicating a data transfer type and an address and a sending unit configured to determine, based on information included in the data transfer request, whether the data transfer request is a target to be compressed. If the data transfer request is not a target to be compressed, the sending unit transfers the data transfer request in a first packet format that includes the attribute information and the address included in the data transfer request. If the data transfer request is a target to be compressed, the sending unit transfers the data transfer request in a second packet format that does not include the attribute information or the address received by the receiving unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates examples of packet identification.

FIG. 14A illustrates a first packet format.

DESCRIPTION OF THE EMBODIMENTS

Various exemplary embodiments, features, and aspects of the invention will be described in detail below with reference to the drawings.

Figure 1:
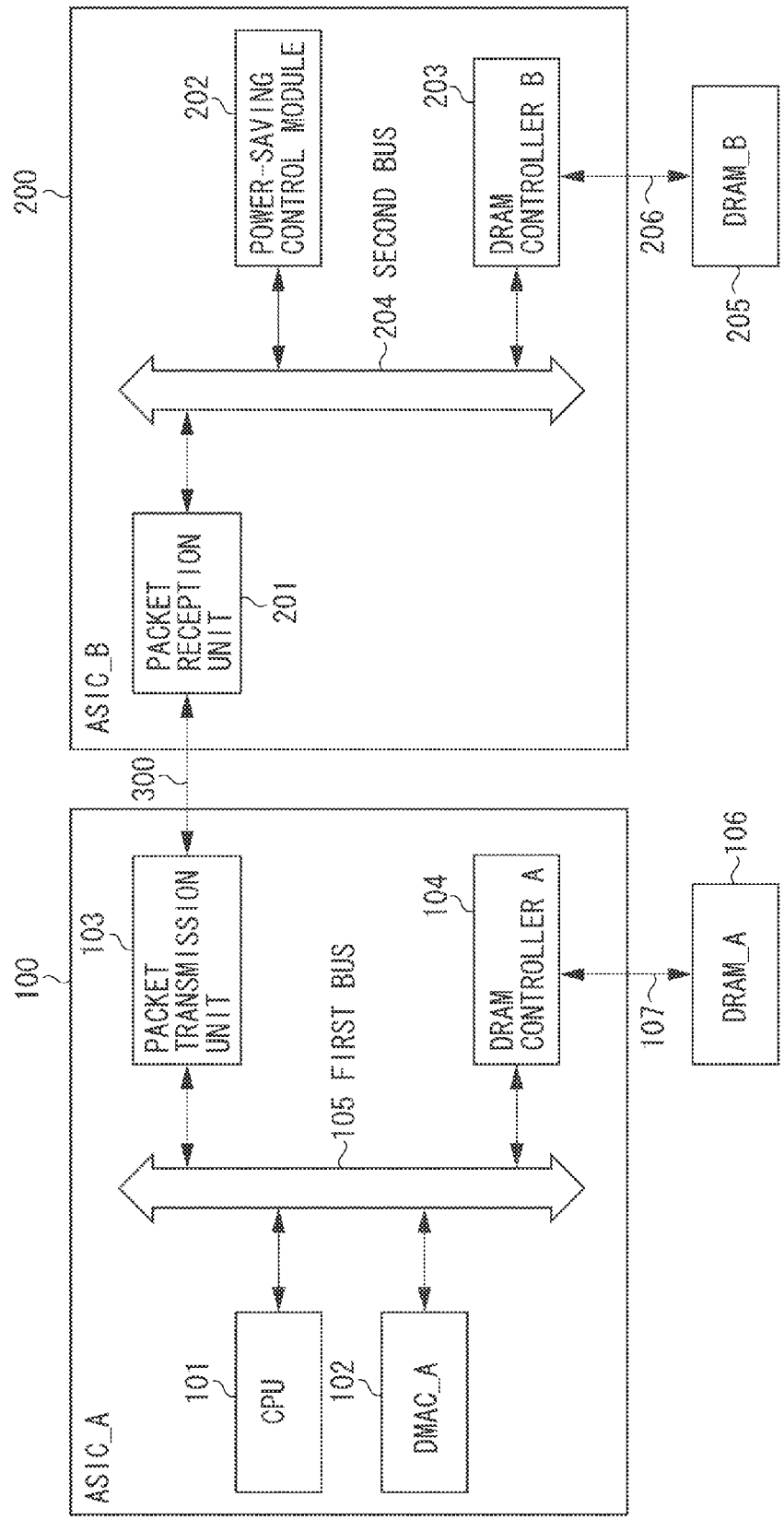
FIG. 1 is a block diagram illustrating a schematic configuration of a data transferring system.

Hereinafter, a first exemplary embodiment will be described. FIG. 1 illustrates a configuration of a system in which an application specific integrated circuit (ASIC)_A 100 and an ASIC_B 200 are connected via a serial bus (third bus) 300. For example, print data is transferred by packets on the serial bus 300.

The ASIC_A 100 includes a first bus 105, a central processing unit (CPU) 101 and a direct memory access controller (DMAC)_A 102 as bus masters, and a packet transmission unit 103 and a dynamic random access memory (DRAM) controller A 104 as bus slaves. The first bus 105 is a parallel bus including a dedicated line for each of the addresses, data, and the like. The CPU 101 and the DMAC_A 102 as bus masters execute data transfer (transmission or reception) with the packet transmission unit 103 or the DRAM controller A 104 as a bus slave via the first bus 105.

The DRAM controller A 104 executes data transfer (write access or read access) with a DRAM_A 106 via a DRAM interface A107. The packet transmission unit 103 converts data transferred via the first bus 105 into data that can be transferred through the serial bus 300 and transfers the converted data to the ASIC_B 200 as a destination of connection.

The ASIC_B 200 includes a second bus 204, a packet reception unit 201 as a bus master, and a power-saving control module 202 and a DRAM controller B 203 as bus slaves. The second bus 204 is a parallel bus including a dedicated line for each of the addresses, data, and the like. The packet reception unit 201 converts data transferred via the serial bus 300 into data that can be transferred through the second bus 204 and executes data transfer with the power-saving control module 202 or the DRAM controller B 203 via the second bus 204. The DRAM controller B 203 executes data transfer with a DRAM_B 205 via a DRAM interface B 206.

Hereinafter, the description will be made assuming that the configuration in FIG. 1 corresponds to part of a printer apparatus including a main chip (ASIC_A 100) executing image processing and a sub chip (ASIC_B 200) executing a print head control operation. In this case, when the main chip as the transmission side data transferring apparatus transfers print data to the sub chip as the reception side data transferring apparatus, the main chip executes power-saving control while checking the status of the sub chip. The DMAC_A 102 as a bus master executes predetermined transfer processing such as transferring print data, and the CPU 101 executes complex processing such as power-saving control operations.

The serial interface inside the transmission side data transferring apparatus receives data transfer requests (transactions) in which print data and power-saving control data is mixed. However, while the DMAC_A 102 transfers consecutive addresses, bus transactions from a plurality of bus masters are mixed on the serial interface. Thus, it is often the case that addresses included in bus transactions are not consecutive. As a result, it is difficult to increase the transfer efficiency based on conventional methods.

In addition, if the main chip transfers print data of a plurality of colors, the sub chip includes print data buffer reason for each color. When the main chip simultaneously transfers print data of a plurality of colors, data of each color is transferred to consecutive addresses. However, since addresses are not consecutive on the serial interface, it is difficult to increase the transfer efficiency based on conventional methods.

According to the present exemplary embodiment, the packet transmission unit 103 and the packet reception unit 201, which are interfaces between the ASIC_A 100 and ASIC_B 200, compress a packet, depending on the bus master.

Figure 3A:
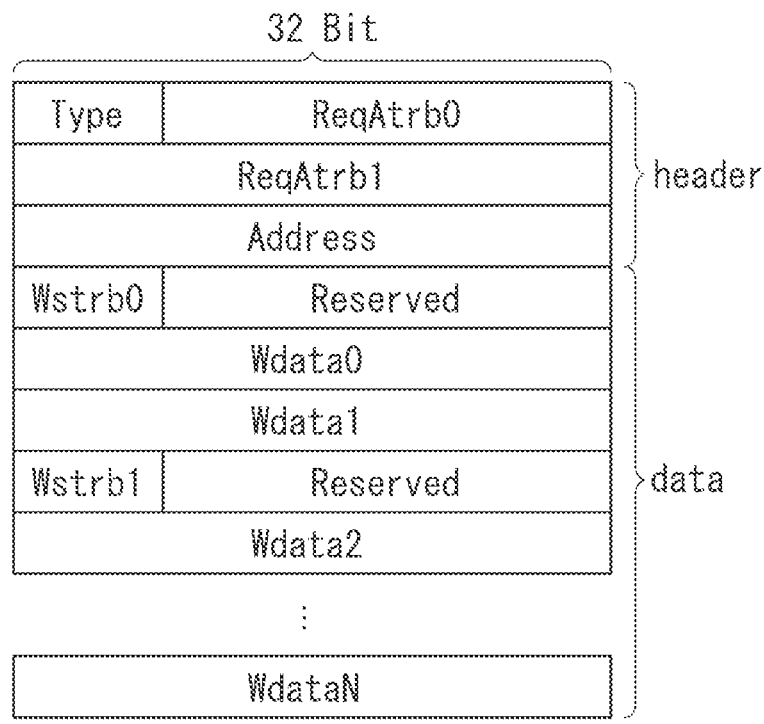
FIG. 3A illustrates a first packet format.
Figure 3B:
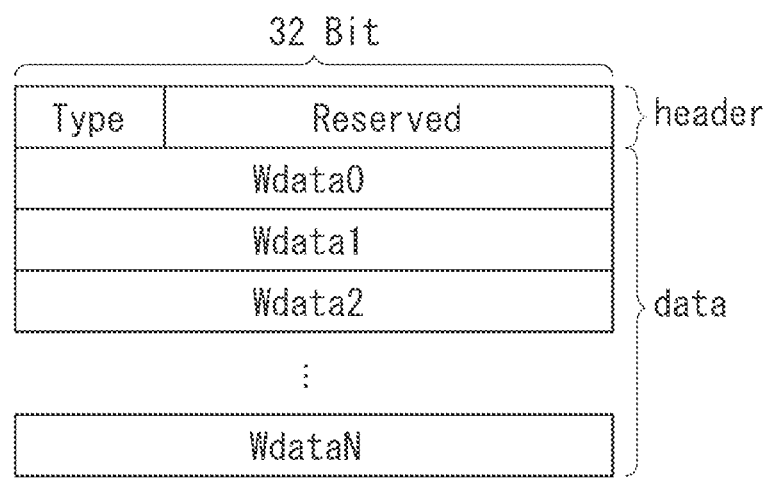
FIG. 3B illustrates a second packet format.

FIGS. 3A and 3B illustrate packet formats according to the present exemplary embodiment. FIGS. 3A and 3B respectively define two types of formats. FIG. 3A illustrates a first packet format. The first packet includes a header portion (which will simply be referred to as a header) and a data portion (which will simply be referred to as data).

Both the header and the data include a plurality of 32-bit unit characters. The header includes an identification (Type) indicating a packet type, a transfer attribute information (ReqAtrb 0/1), and a destination address (Address). The data includes write data (Wdata) and a strobe (Wstrb) and is generated only when Write transfer is executed.

FIG. 3B illustrates a second packet format, which also includes a header portion and a data portion. However, compared with the first packet format in FIG. 3A, the header portion does not include fields for storing transfer attribute information (ReqAtrb 0/1) and a destination address (Address), and the data portion does not include a field for storing a strobe (Wstrb).

The identification (Type) indicating a packet type determines whether a packet is in the first packet format or the second packet format.

FIG. 4 illustrates examples of the identification (Type). The high-order bit of the identification is a flag indicating a packet format. In FIG. 4, if the high-order bit is 0, the packet is in the first packet format. If the high-order bit is 1, the packet is in the second packet format. The low-order bit is a flag indicating whether to execute Write transfer or Read transfer. In FIG. 4, if the low-order bit is 0, read transfer is executed. If the low-order bit is 1, write transfer is executed.

Figure 14B:
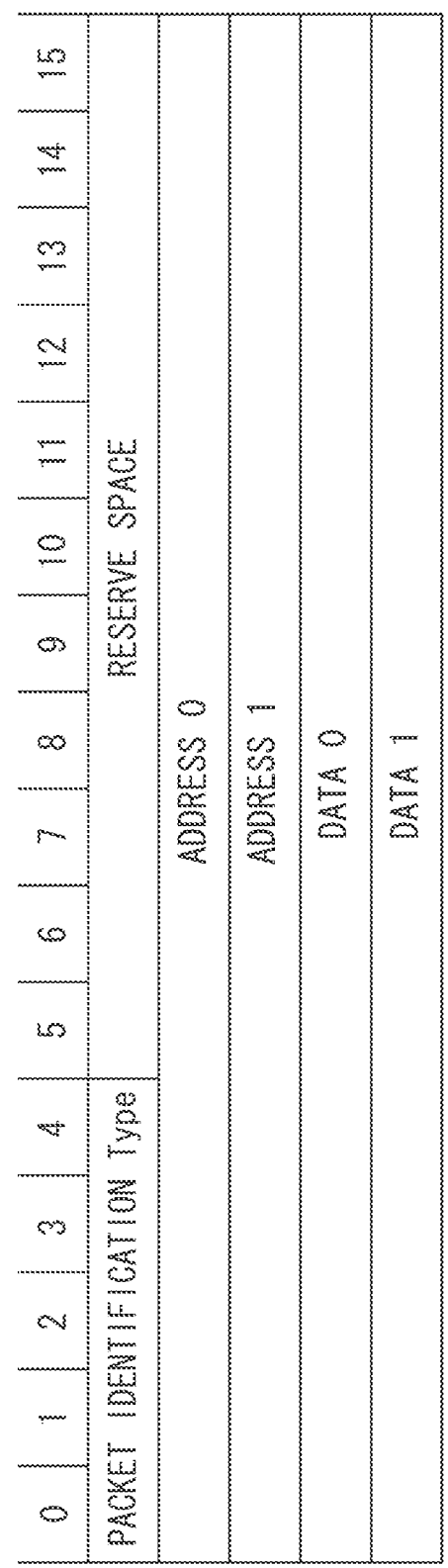
FIG. 14B illustrates a second packet format.

The following description will be made based on an example where a character is formed by 32 bits. However, as illustrated in FIGS. 14A and 14B, a character may be formed by 16 bits. FIG. 14A illustrates a first packet format, and FIG. 14B illustrates a second packet format which is a compressed packet.

Figure 5:
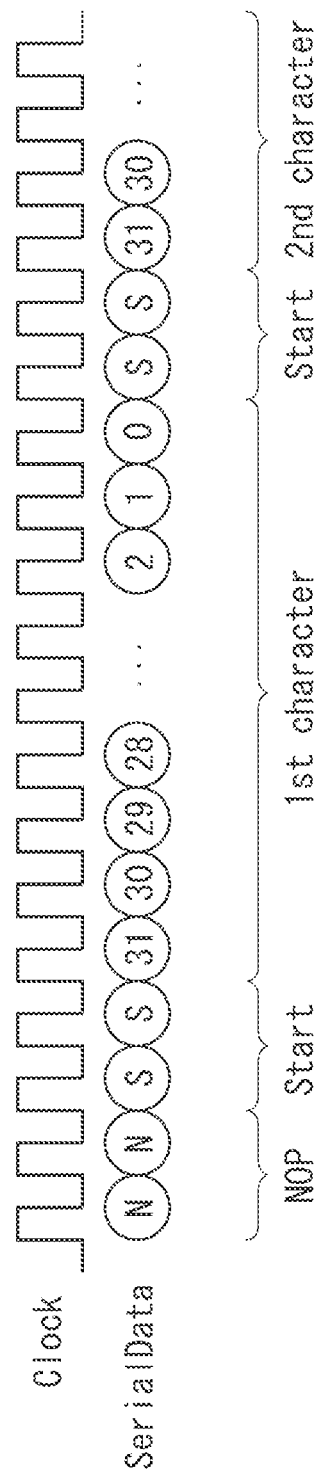
FIG. 5 illustrates data transferred through a serial bus after parallel-serial conversion.

FIG. 5 illustrates 32-bit serial transmission. Serial data N and S represent no operation (NOP) and a start bit, respectively. Serial data denoted by numbers represent bit positions in a character. The parallel-serial conversion is executed for each character of a 32-bit unit. Two-bit start bits indicating a character head are added to a character of a 32-bit unit, and the 2-bit start bits are first transmitted. Next, starting with the highest-order bit, a character of a 32-bit unit is sequentially transmitted 1 bit at a time. The parallel-serial converted character is transmitted to the reception side ASIC_B 200 via the serial bus 300, in accordance with a clock.

Figure 2:
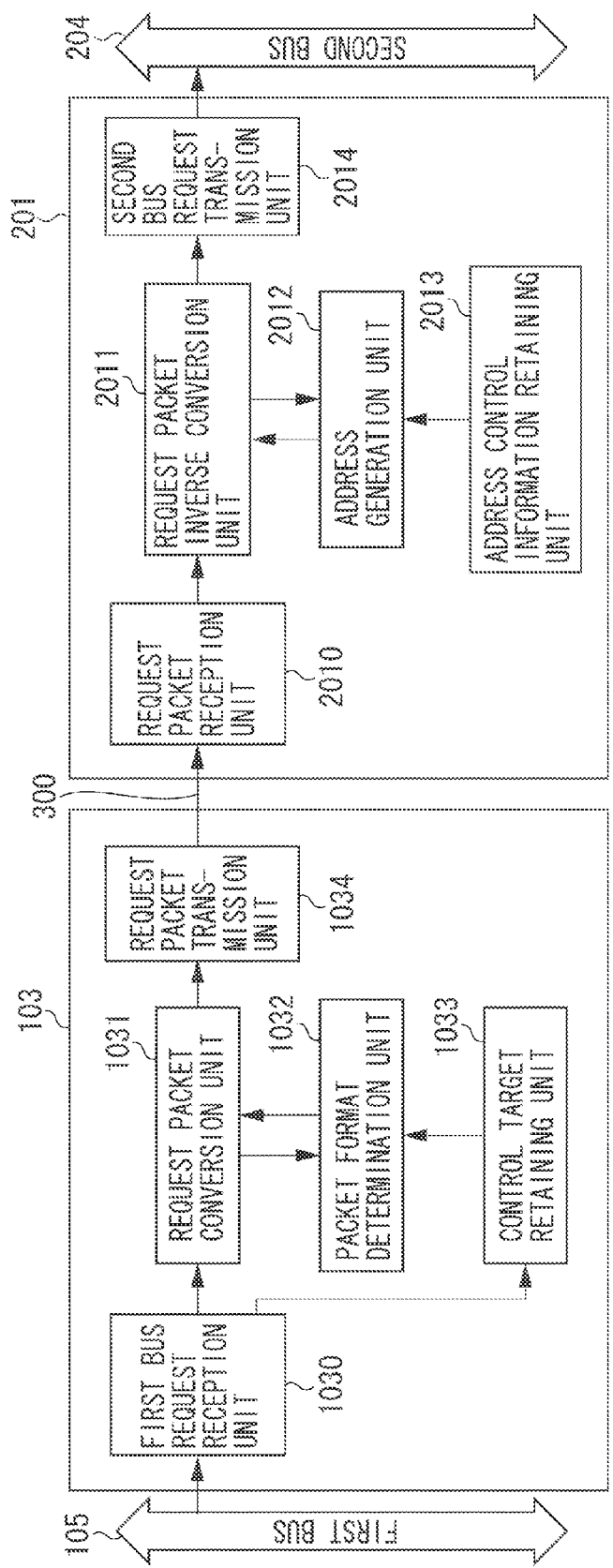
FIG. 2 illustrates a configuration of a packet transmission unit and a packet reception unit.

FIG. 2 illustrates a schematic configuration of the packet transmission unit 103 and the packet reception unit 201 realizing a transfer method according to the present exemplary embodiment.

First, the packet transmission unit 103 will be described.

A first bus request reception unit 1030 receives a bus request (data transfer request) from the CPU 101 or the DMAC_A 102 via the first bus 105. The bus request includes a data transfer destination address (Address), a flag indicating whether Write transfer or Read transfer, write data (Wdata), a strobe (Wstrb), and transfer attribute information (ReqAtrb 0/1).

The transfer attribute information (ReqAtrb 0/1) includes information indicating a transfer length, a transfer priority, and a number (which will be referred to as a master ID) identifying a bus master from which the bus request is transmitted. The first bus request reception unit 1030 identifies a destination address (Address). If the destination address in the supplied bus request is the address of the ASIC_B 200, the first bus request reception unit 1030 transfers the bus request to a request packet conversion unit 1031. If the destination address is the address of a control target retaining unit 1033, the first bus request reception unit 1030 transfers the received bus request to the control target retaining unit 1033.

The request packet conversion unit 1031 converts the bus request received from the first bus request reception unit 1030 into a packet.

The request packet conversion unit 1031 transfers the received bus request to a packet format determination unit 1032. Next, in accordance with instructions from the packet format determination unit 1032, the request packet conversion unit 1031 converts the bus request into a packet in the first packet format or the second packet format. Next, the request packet conversion unit 1031 transfers the converted packet to a request packet transmission unit 1034.

The control target retaining unit 1033 is a register retaining information about bus requests of a target to be converted into certain packet formats. Addresses are allocated to these registers in advance by the CPU or the like. In the present exemplary embodiment, bus requests that are targets to be converted into the second packet format are determined based on a master ID included in the bus requests. The master ID is information for identifying an origin of issuing bus request. In the present exemplary embodiment, since bus requests from the DMAC_A 102 are targets to be converted into the second packet format, the master ID corresponding to the DMAC_A 102 is set in the control target retaining unit 1033.

The packet format determination unit 1032 receives a bus request from the request packet conversion unit 1031 (or the first bus request reception unit 1030) and compares the information retained in the control target retaining unit 1033 with the information included in the bus request. As a result of the comparison, the packet format determination unit 1032 determines whether to convert the bus request into the first packet format or the second packet format (determines whether the bus request is a target to be compressed). Next, the packet format determination unit 1032 gives instructions to the request packet conversion unit 1031. More specifically, the packet format determination unit 1032 compares the master ID included in the bus request with the master ID retained in the control target retaining unit 1033, and if the master ID does not match the retained master ID, the packet format determination unit 1032 determines to convert the bus request into the first packet format. Otherwise, the packet format determination unit 1032 determines to convert the bus request into the second packet format.

The request packet transmission unit 1034 receives a request which has been converted into a packet from the request packet conversion unit 1031, executes parallel-serial conversion, and transmits the request to the serial bus 300.

Figure 6:
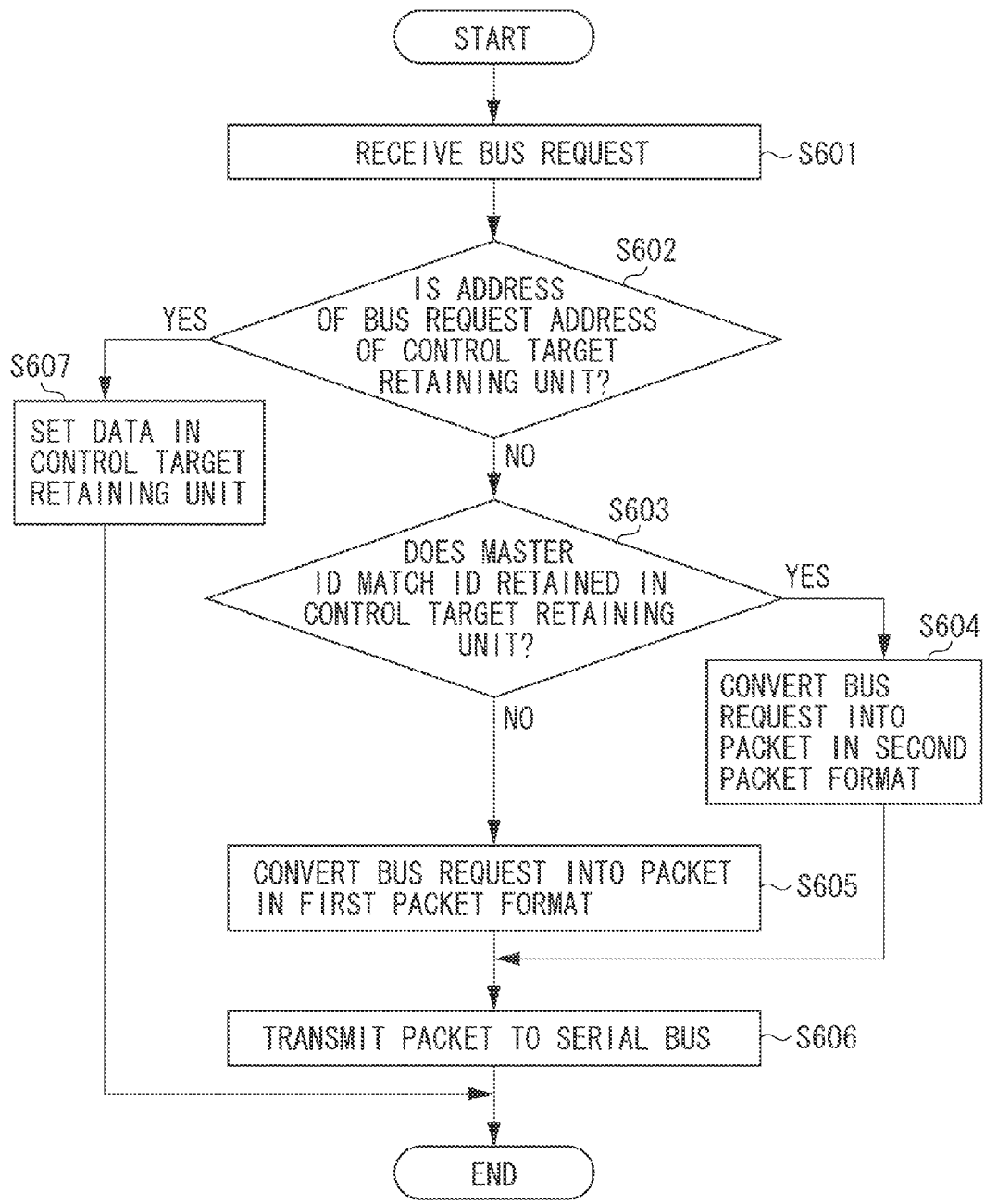
FIG. 6 is a flow chart illustrating an operation of the packet transmission unit.

FIG. 6 is a flow chart illustrating an operation of the packet transmission unit 103.

The operation starts when the packet transmission unit 103 receives a bus request from the CPU 101 or the DMAC_A 102 via the first bus 105.

First, in step S601, the first bus request reception unit 1030 receives a bus request. Next, in step S602, the first bus request reception unit 1030 determines whether the address of the received bus request is the address of the control target retaining unit 1033. If true (YES in step S602), the operation proceeds to step S607. In step S607, the first bus request reception unit 1030 sets data included in the bus request in the control target retaining unit 1033, and the operation proceeds to End. In step S602, if false (NO in step S602), the first bus request reception unit 1030 transfers the bus request to the request packet conversion unit 1031, and the operation proceeds to step S603.

Next, in step S603, the packet format determination unit 1032 determines whether the master ID included in the bus request matches information retained in the control target retaining unit 1033. In step S603, if the master ID matches the information (YES in step S603), the operation proceeds to step S604. In step S604, the request packet conversion unit 1031 converts the received bus request into a packet in the second packet format. For example, the request packet conversion unit 1031 converts a bus request from the DMAC_A 102 into a packet in the second packet format.

However, in step S603, if the master ID do not match the information (NO in step S603), the operation proceeds to step S605. In step S605, the request packet conversion unit 1031 converts the received bus request into a packet in the first packet format. For example, the request packet conversion unit 1031 converts a bus request from the CPU 101 into a packet in the first packet format.

Next, in step S606, the request packet transmission unit 1034 executes parallel-serial conversion on the packet converted by the request packet conversion unit 1031 and transmits the packet to the serial bus 300.

Next, the packet reception unit 201 will be described. A request packet reception unit 2010 receives serial data transmitted from the ASIC_A 100 via the serial bus 300 and executes serial-parallel conversion on the serial data. This serial-parallel conversion is executed on a 32-bit character basis. First, the request packet reception unit 2010 recognizes the 2-bit start bits and converts the serial data following the 2-bit start bits into parallel data on a 32-bit basis. In this way, a packet including a plurality of 32-bit characters is generated. The packet generated by the request packet reception unit 2010 is transferred to a request packet inverse conversion unit 2011.

The request packet inverse conversion unit 2011 converts the received packet into a format according to the second bus 204 depending of the identification (Type) that is included in the request packet supplied from the request packet reception unit 2010 and that indicates a transfer type. The first bus and the second bus may have a different format. However, herein, for ease of description, the second bus has a request format identical to that of the first bus.

If the identification that is included in the received packet and that indicates a transfer type indicates the first packet format, the request packet inverse conversion unit 2011 extracts an address (Addr) and transfer attribute information (ReqAtrb 0/1) from the received packet and converts the packets into the request format to the second bus 204. If the identification included in the supplied packet indicates the second packet format, the request packet inverse conversion unit 2011 requests an address (Addr) and transfer attribute information (ReqAtrb 0/1) from an address generation unit 2012 and converts the packets into the request format of the second bus 204.

Figure 7:
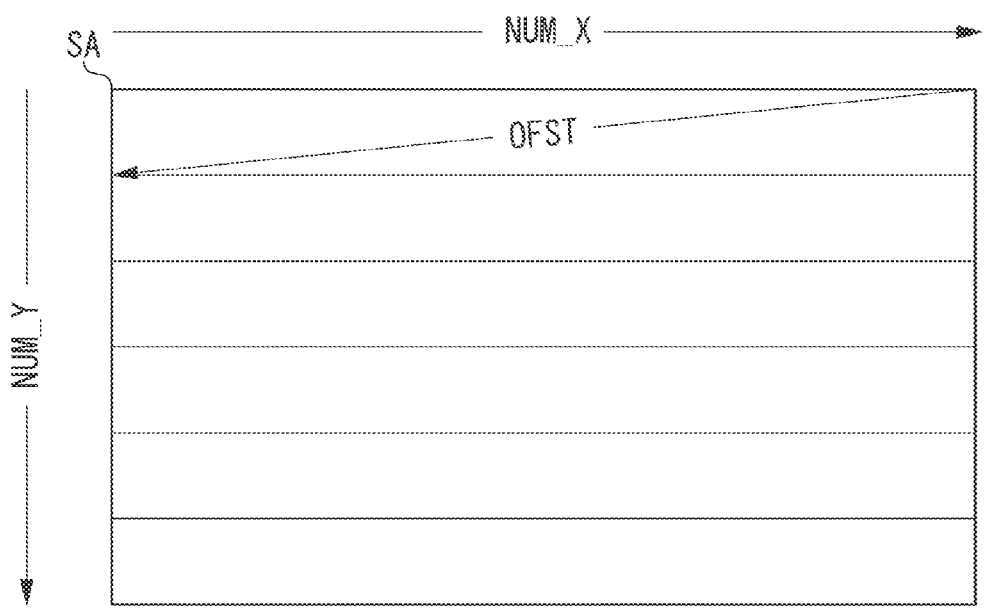
FIG. 7 illustrates a two-dimensional image data transfer operation.

An address control information retaining unit 2013 is a register retaining information necessary for generating addresses. In the present exemplary embodiment, the DMAC_A 102 transfers two-dimensional image data illustrated in FIG. 7 to the DRAM_B 205. The image data in FIG. 7 is expressed by a transfer start address SA, the number of data transfer operations in the X direction NUM_X times, the number of lines in the Y direction NUM_Y, and an offset address OFST used when data transfer proceeds in the Y direction by 1. The DMAC_A 102 transfers 32-bits data in a single data transfer operation.

The address control information retaining unit 2013 retains values of the start address SA, the numbers NUM_X and NUM_Y, and the offset address OFST, as well as information about the transfer attribute information (ReqAtrb 0/1) and the strobe (Wtrb). In addition, addresses are allocated to the registers in advance by the CPU or the like. In the present exemplary embodiment, since the ASIC_B 200 does not include a CPU, the CPU 101 inside the ASIC_A 100 sets registers of the address control information retaining unit 2013 in advance. For example, the CPU 101 inside the ASIC_A 100 issues a bus request for setting registers of the address control information retaining unit 2013, and this bus request is a packet in the first packet format. The bus request is transmitted from the ASIC_A 100 to the ASIC_B 200 and is set by the request packet reception unit 2010 or the like.

The address generation unit 2012 generates the address (Address), the transfer attribute information (ReqAtrb 0/1), and the strobe (Wtrb) used when the second packet format is converted into the request format of the second bus 204, based on information retained in the address control information retaining unit 2013.

In the present exemplary embodiment, the address generation unit 2012 transfers information retained in the address control information retaining unit 2013 as the transfer attribute information (ReqAtrb 0/1) and the strobe (Wtrb) without change. In addition, the address generation unit 2012 includes an intermediate address register (not illustrated) retaining an intermediate address (Next Address).

Figure 8:
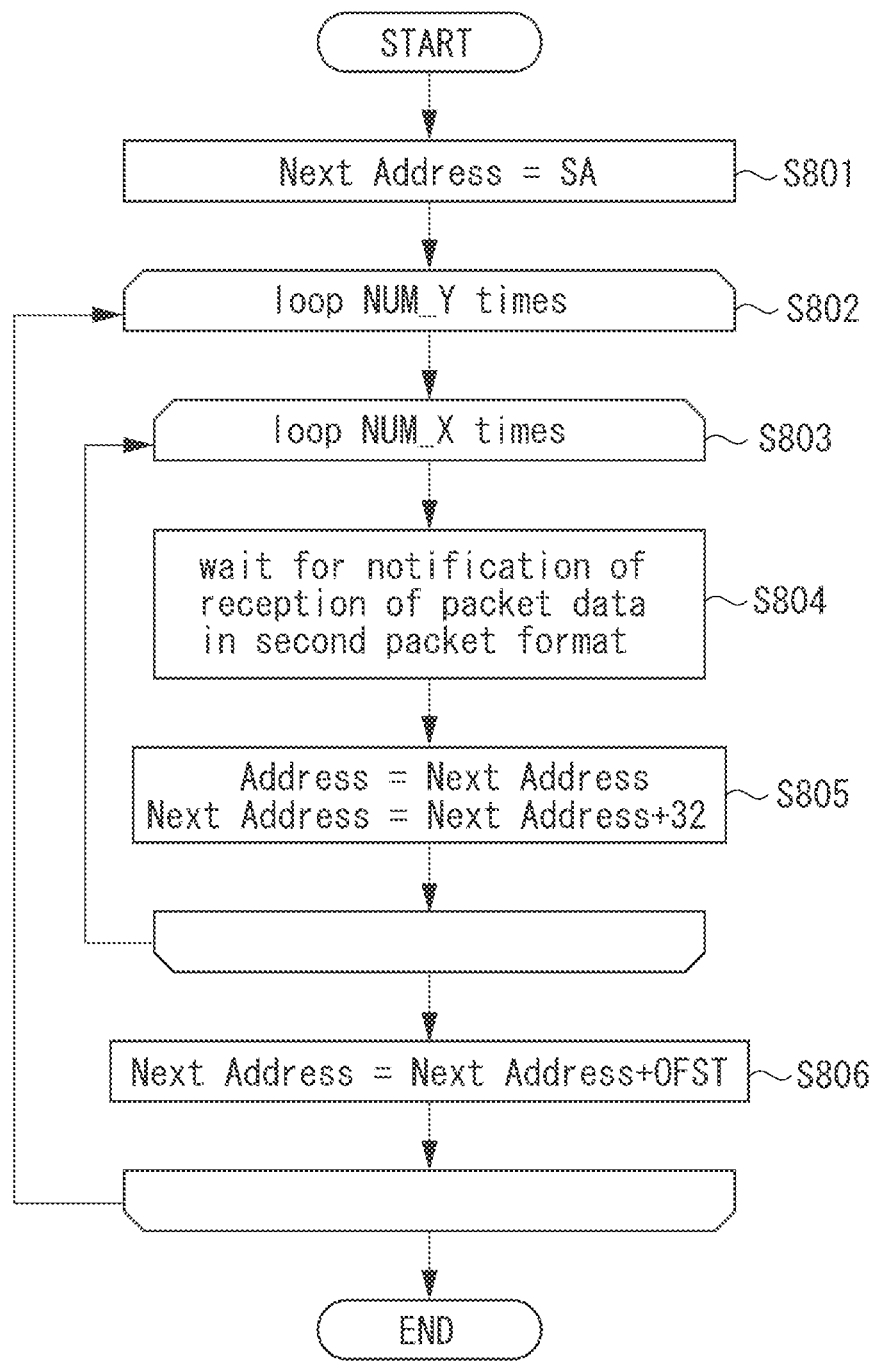
FIG. 8 is a flow chart illustrating an operation of an address generation unit.

The address (Address) and the strobe (Wtrb) are generated by an address generation operation according to the flowchart in FIG. 8. In the present exemplary embodiment, when the CPU 101 or the like sets data such as the start address (SA) in the address control information retaining unit 2013, the address generation unit 2012 starts the address generation operation in FIG. 8 (detailed description of this operation will be described below).

The second bus request transmission unit 2014 transmits the request converted into the request format to the second bus 204 to the power-saving control module 202 or the DRAM controller B 203 via the second bus 204.

FIG. 8 illustrates the address generation operation executed by the address generation unit 2012.

First, in step S801, the address generation unit 2012 loads the start address SA from the address control information retaining unit 2013 to the intermediate address register. Next, in steps S802 and S803, the address generation unit 2012 loads the number of data transfer operations in the X direction NUM_X times and the number of lines in the Y direction NUM_Y from the address control information retaining unit 2013 and sets the number of repetitive operations (number of loop).

Next, in step S804, the address generation unit 2012 waits for a request generation request from the request packet inverse conversion unit 2011. Upon receiving a request from the request packet inverse conversion unit 2011, the address generation unit 2012 outputs an address retained in the intermediate address register as the request address (Address) of the second bus. Next, in step S805, the address generation unit 2012 adds a single data transfer amount (32 in the present exemplary embodiment) to the address retained in the intermediate address register.

Steps S804 and S805 are repeated NUM_X times. Next, in step S806, the address generation unit 2012 adds the offset address OFST to the address retained in the intermediate address register. The address generation unit 2012 repeats steps S802 to S806 each time the number of lines in the Y direction is increased. After the process is repeated NUM_Y times, the operation proceeds to END. The address control information retaining unit 2013 may include a register retaining other information (an address increase amount, for example) set in a general DMAC.

Figure 9:
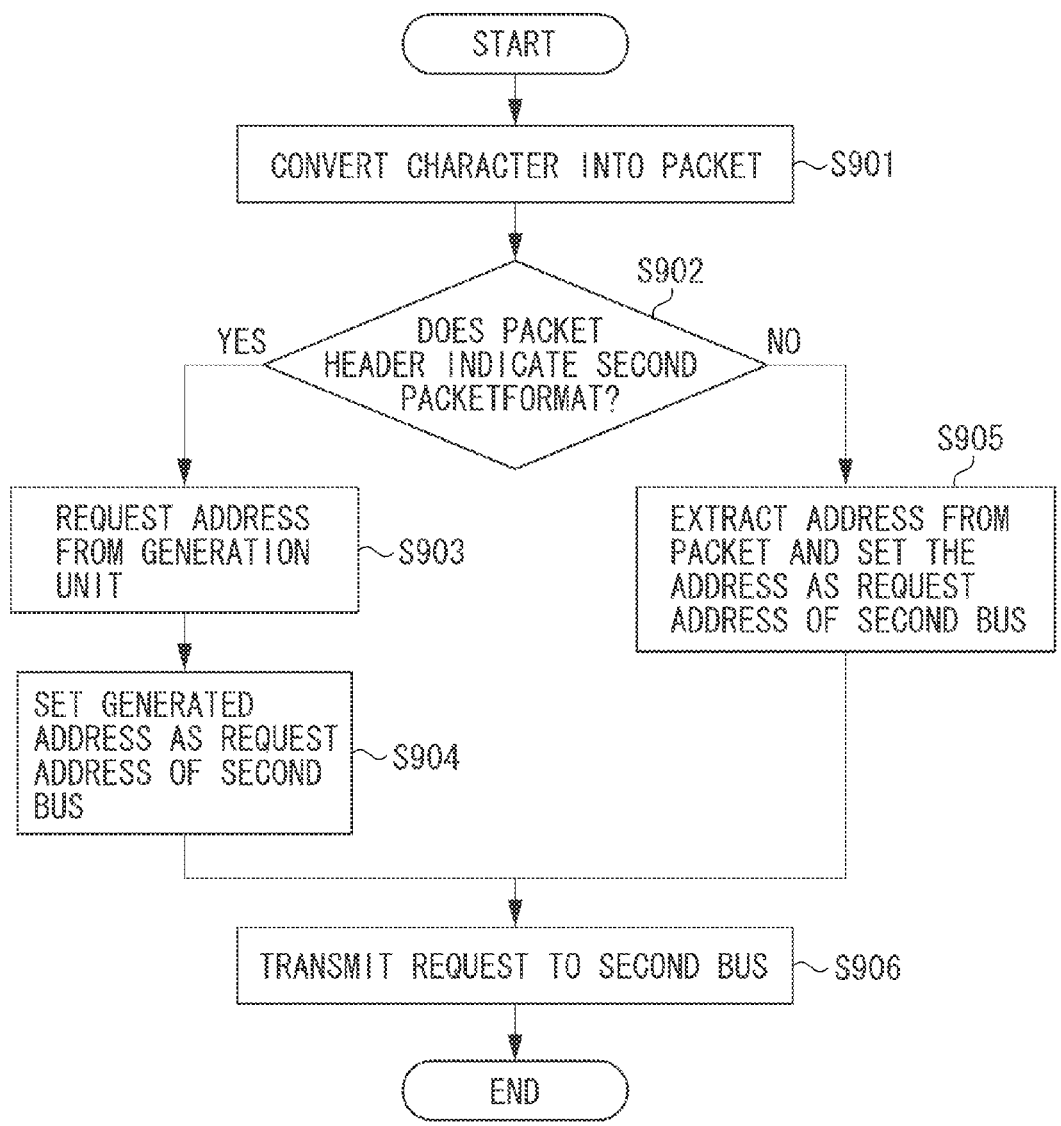
FIG. 9 is a flow chart illustrating an operation of the packet reception unit.

FIG. 9 is a flow chart illustrating an operation of the packet reception unit 201.

When the packet reception unit 201 receives serial data on a character basis from the ASIC_A 100 via the serial bus 300, the packet reception unit 201 starts the operation.

First, in step S901, the request packet reception unit 2010 converts the serial data into parallel data per character and converts the parallel data into a packet. Next, in step S902, the request packet inverse conversion unit 2011 analyzes the identification (TYPE) in the packet header to determine whether the highest-order bit is 1, namely, whether the packet is in the second packet format.

If the request packet inverse conversion unit 2011 receives a packet in the second packet format (YES in step S902), the operation proceeds to step S903. In step S903, the request packet inverse conversion unit 2011 requests an address from the address generation unit 2012. Next, in step S904, the request packet inverse conversion unit 2011 stores the address generated by the address generation unit 2012 in a packet, as the request address of the second bus.

However, in step S902, if the request packet inverse conversion unit 2011 does not receive a packet in the second packet format (NO in step S902), the operation proceeds to step S905. In step S905, the request packet inverse conversion unit 2011 stores the address included in the packet received from the request packet reception unit 2010 in a packet, as the request address of the second bus. Next, in step S906, the second bus request transmission unit 2014 transmits the packet transferred from the request packet inverse conversion unit 2011 to the second bus.

As described above, based on the data transferring apparatus according to the present exemplary embodiment, even if transactions from a plurality of bus masters exist on an interface, when the master ID added in a bus request indicates the DMAC_A 102, the packet transmission unit 103 controls to transfer a packet in the second packet format in which the address and the transfer attribute information of the packet are omitted. Thus, the transfer efficiency of the serial bus 300 is improved.

In addition, since the packet transmission unit 103 is configured to start the operation in response to reception of a request transaction from the first bus, the packet transmission unit 103 requires a smaller data buffer capacity.

In the present exemplary embodiment, the control target retaining unit 1033 retains a master ID and the packet format determination unit 1032 determines a packet format based on the master ID added in a bus request. However, the control target retaining unit 1033 may retain address space information. In this way, a packet format may be determined based on a destination address space added in the bus request. More specifically, if a destination address is an I/O address space, namely, the power-saving control module 202 (or any component other than the DRAM_B 205), the packet format determination unit 1032 determines the first packet format to be the packet format. If the destination address is not an I/O address space, namely, the memory address space of the DRAM_B 205, the packet format determination unit 1032 determines the second packet format to be the packet format. In addition, the present exemplary embodiment has been described based on a two-dimensional transfer operation as an example. However, as long as the address generation unit 2012 can be set to generate an address, the present exemplary embodiment can be applied, irrespective of the transfer method. For example, to execute an n-dimensional (n is an integer of 1 or more) transfer operation, it is only necessary to arrange a register or a counter retaining the number of loop n.

In addition, if the transmitting-end data transferring apparatus 100 transfers print data of a plurality of colors, it is only necessary to extend a field indicating a transfer-source master ID in the identification in a packet.

For example, if the transmission side data transferring apparatus 100 includes a plurality of DMACs corresponding to the number of colors and each DMAC transfers a color, the transmission side data transferring apparatus 100 includes a plurality of control target retaining units 1033 corresponding to the plurality of DMACs, and the master IDs are set in the respective control target retaining units 1033. The packet format determination unit 1032 refers to information retained in the plurality of control target retaining units 1033 and determines whether a packet needs to be converted into the first packet format or the second packet format. When converting a packet into the second packet format, the request packet conversion unit 1031 adds a transfer source master ID to the identification in the packet.

In addition, the reception side data transferring apparatus 200 includes a plurality of address generation units 2012 and address control information retaining units 2013 corresponding to the plurality of DMACs, and the respective address control information is set. If the identification in a packet indicates the second packet format, depending on the transfer source master ID in the identification, the request packet inverse conversion unit 2011 receives an address and transfer attribute information from one of the address generation units 2012 and converts the packet into the request format to the second bus.

Thus, if the packet transmission unit 103 determines that the master ID added in a bus request indicates a DMAC, the packet transmission unit 103 transfers a packet in the second packet format in which the address and the transfer attribute information of the packet are compressed. In this way, the transfer efficiency is improved.

In addition, if the reception side data transferring apparatus includes a DMAC for executing data transfer between an IO device and a DRAM, the address generation function of this DMAC can be used to receive a packet in the second packet format.

Figure 10:
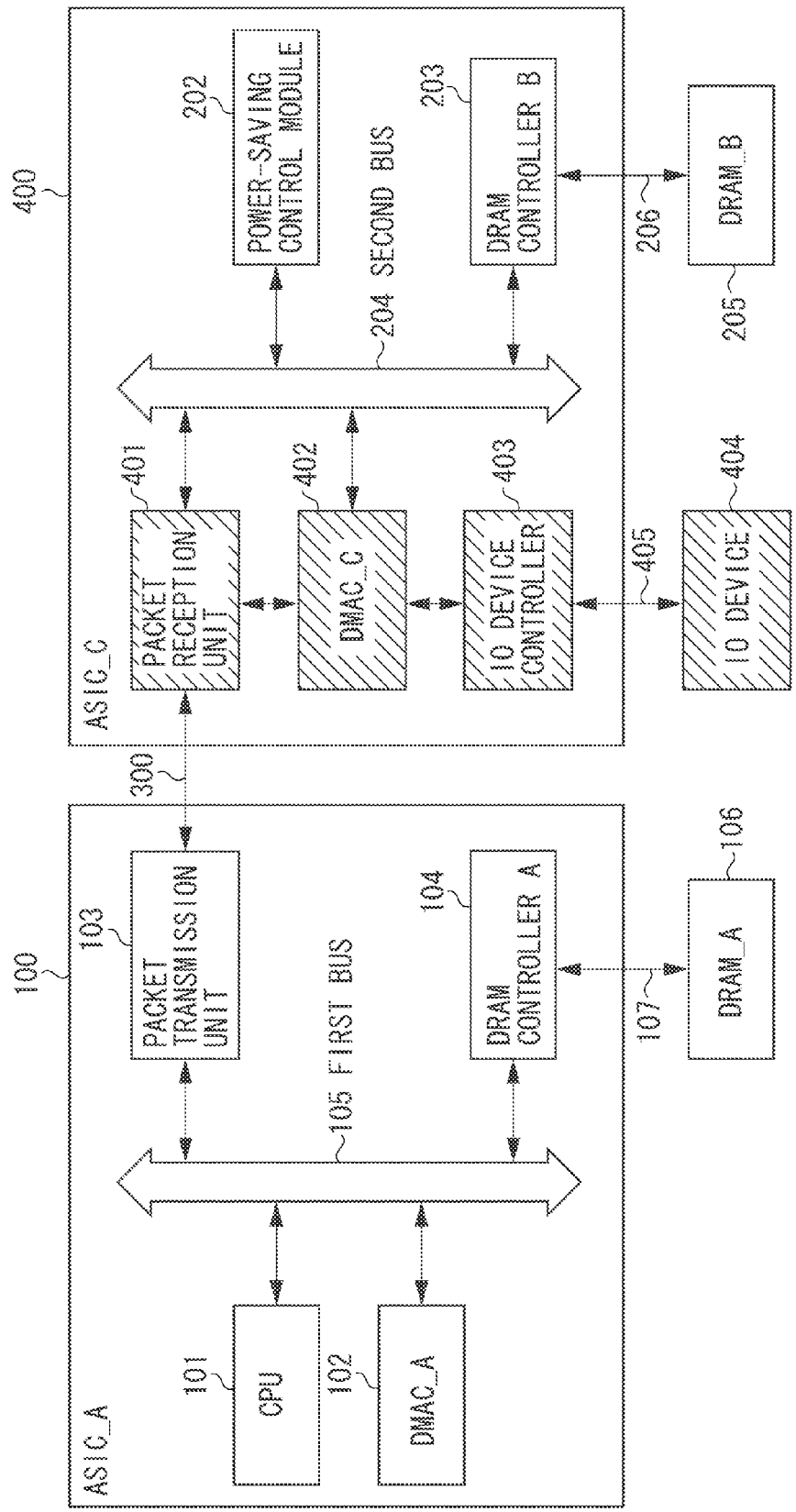
FIG. 10 is a block diagram illustrating a schematic configuration of a data transferring system.

FIG. 10 illustrates a configuration of a system in which the ASIC_A 100 and an ASIC_C 400 are connected via the serial bus 300.

The ASIC_C 400 includes a DMAC_C 402 as a bus master, in addition to the components of the ASIC_B 200. The DMAC_C 402 executes data transfer between an IO device controller 403 and a packet reception unit 401, and the DRAM controller B 203. The IO device controller 403 executes data transfer with an IO device 404 via an IO device interface 405.

Figure 11:
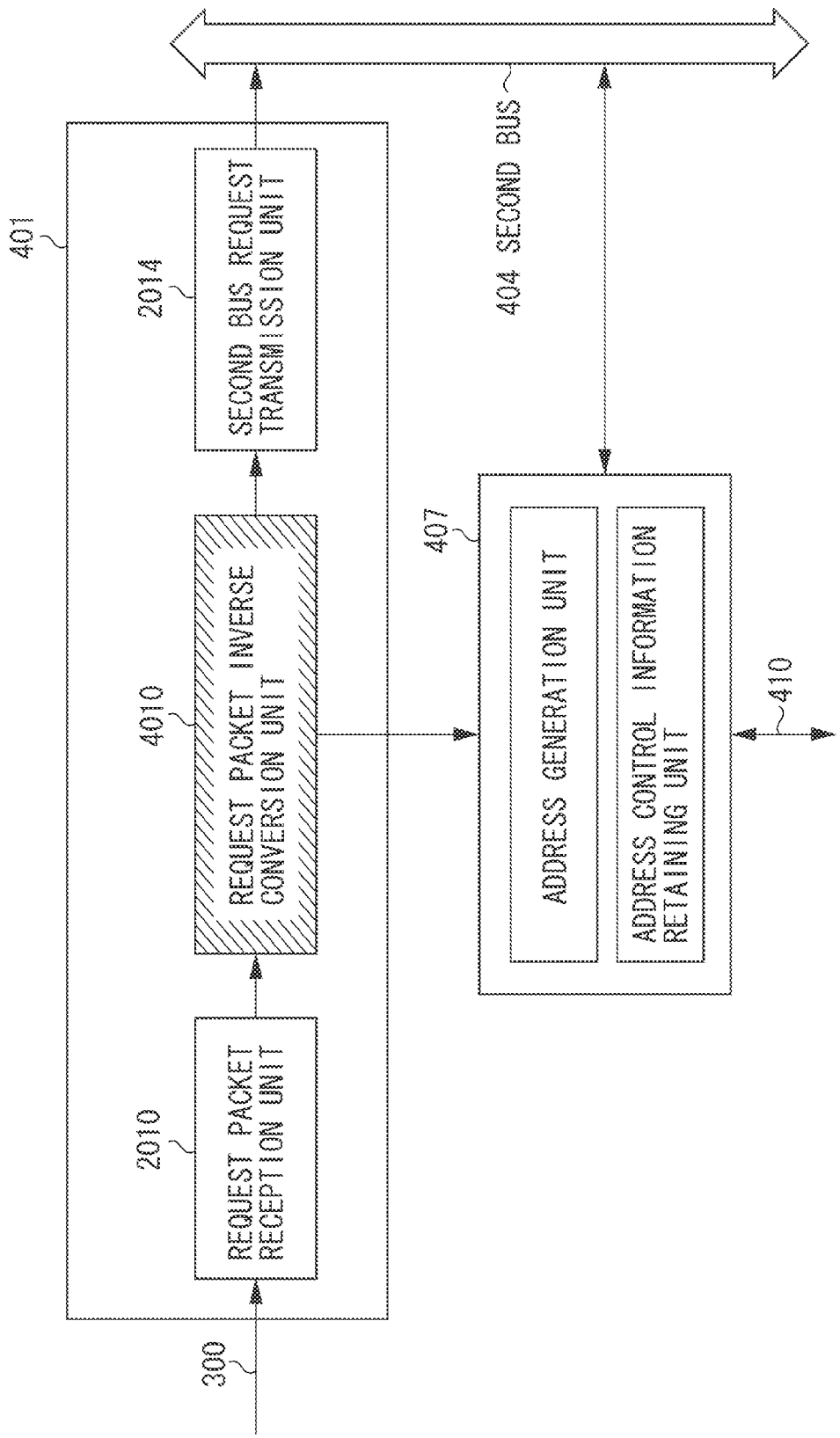
FIG. 11 illustrates a configuration of a packet reception unit.

FIG. 11 illustrates a configuration of the packet reception unit 401 for realizing a transfer method according to the present exemplary embodiment.

Depending on the identification (Type) indicating a transfer type, a request packet inverse conversion unit 4010 converts the packet into the request format of the second bus. Herein, the request format of the second bus is the same as that of the first bus. If the identification indicating a packet type indicates the first packet format, the request packet inverse conversion unit 4010 extracts an address (Addr) and transfer attribute information (ReqAtrb 0/1) from the received packet and converts the packet into the request format of the second bus. If the identification indicates the second packet format, the request packet inverse conversion unit 4010 transfers the data to the DMAC_C 402.

The DMAC_C 402 is capable of executing one-dimensional transfer operation and two-dimensional transfer operation. The DMAC_C 402 transfers one-dimensional data between the IO device controller 403 and the DRAM controller B 203 and two-dimensional data between the packet reception unit 401 and the DRAM controller B 203. The DMAC_C 402 includes an address generation unit and an address control information retaining unit. The address control information retaining unit includes registers retaining information about the transfer start address SA, the number of data transfer operations in the X direction NUM_X times, the number of lines in the Y direction NUM_Y, and the offset address OFST used when data transfer proceeds in the Y direction by 1, for the two-dimensional transfer operation in FIG. 7. The following description will be made assuming that the two-dimensional transfer operation in FIG. 7 is executed. As in the address control information retaining unit 2013 in FIG. 2, addresses are allocated to the registers in advance by the CPU or the like. If the DMAC_C 402 has a single channel, the DMAC_C 402 exclusively executes data transfer of the IO device controller 403 and data transfer of the packet reception unit 401. If the DMAC_C 402 has a plurality of channels, the DMAC_C 402 executes data transfer of each of the channels in parallel.

Figure 12:
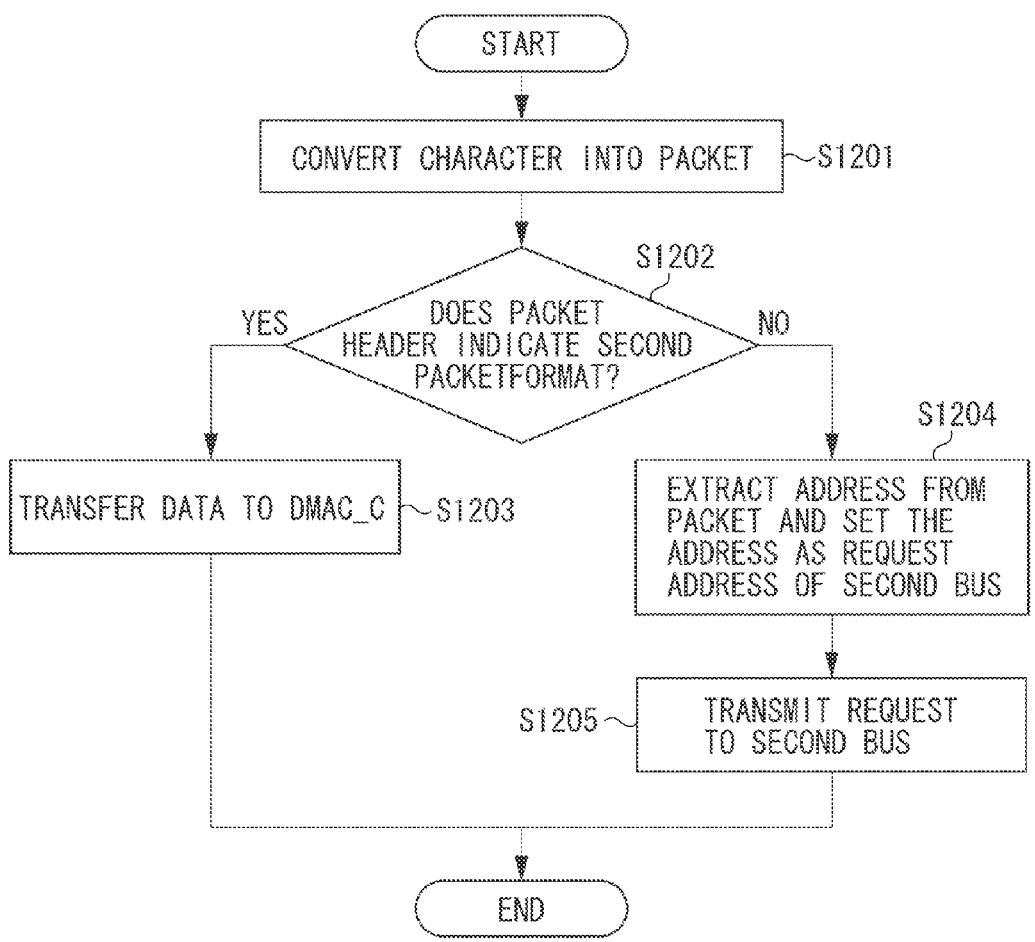
FIG. 12 is a flow chart illustrating an operation of the packet reception unit.
Figure 13:
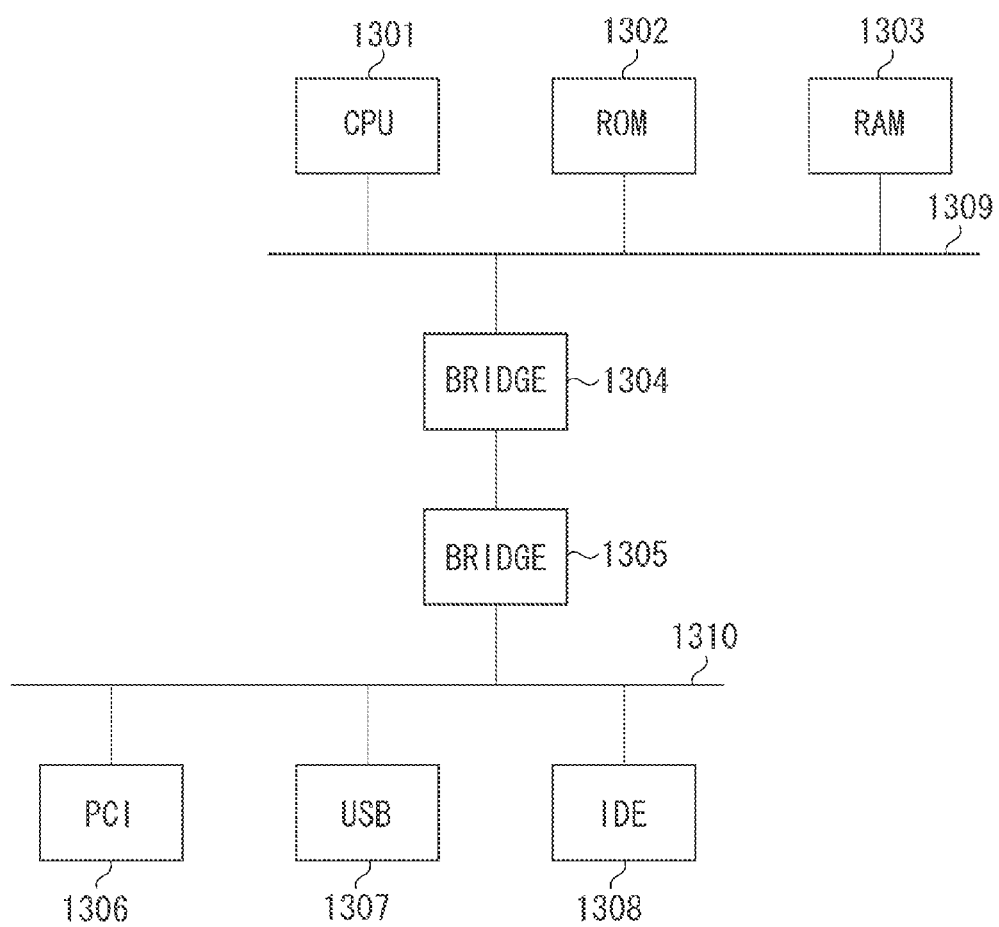
FIG. 13 illustrates a configuration of an interchip communication system.

FIG. 12 is a flow chart illustrating an operation of the packet reception unit 401.

When the packet reception unit 401 receives a character transmitted from the ASIC_A 100 via the serial bus 300, the packet reception unit 401 starts the operation.

First, in step S1201, the request packet reception unit 2010 converts the character into a packet. Next, in step S1202, the request packet inverse conversion unit 4010 analyzes the identification (TYPE) in the packet header and determines whether the highest-order bit is 1, namely, whether the packet is in the second packet format. In step S1202, if true (YES in step S1202), the operation proceeds to step S1203. In step S1203, the request packet inverse conversion unit 4010 transfers the data to the DMAC_C 402, and the operation proceeds to END. If false (NO in step S1202), the operation proceeds to step S1204. In step S1204, the request packet inverse conversion unit 4010 sets the address in the received packet as the request address of the second bus. Next, in step S1205, the second bus request transmission unit 2014 transmits the request to the second bus.

As described above, based on the data transferring apparatus according to the present exemplary embodiment, by using an existing DMAC to generate an address in the second packet format, the circuit size can be reduced.

In the above exemplary embodiment, a serial bus is used as the bus 300 between chips. However, the present exemplary embodiment is applicable even if the bus 300 is a parallel bus. For example, the present exemplary embodiment is applicable to Network On Chip in which parallel transfer is executed based on a packet width and to other physical transfer modes such as wireless communication. Namely, the present exemplary embodiment is highly effective in data transfer in which data is packetized in the logical layer, and the present exemplary embodiment is not limited by the configuration of the physical layer.

In addition, while the above exemplary embodiment has been described based on data transfer between integrated circuits (between chips or between modules), the present exemplary embodiment is also applicable to data transfer in a single integrated circuit (in a single chip or in a single module).

However, since the data transfer capability is lower in data transfer between chips than in data transfer in a chip, it is more likely that a bottleneck is caused in a system. In data transfer in a chip, a signal line physically exists for each of the "attribute information," "address," and "data." Thus, data can be transferred in a simultaneous and parallel manner. In contrast, in data transfer between chips, to reduce the product cost, a common signal line is used (since the IO pins of the chips increase the cost) and data is transferred in a time-series manner. Thus, the improvement in the transfer efficiency according to the above exemplary embodiment is more significant in data transfer between chips than in data transfer in a chip.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a non-transitory computer-readable medium). In such a case, the system or apparatus, and the recording medium where the program is stored, are included as being within the scope of the present invention.

In addition, the protocol of the first bus and the second bus may be Advanced eXtensible Interface (AXI) or Open Core Protocol (OCP). Alternatively, the protocol of the first bus may be different from that of the second bus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-283300 filed Dec. 26, 2011, which is hereby incorporated by reference herein in its entirety.

What is claimed is:

1. A data transferring apparatus, comprising:
a receiving unit configured to receive a data transfer request from a plurality of origins issuing the data transfer request respectively, wherein the data transfer request includes attribute information and an address, and the attribute information includes an identification which indicates the origin issuing the data transfer request; and
a sending unit configured to transfer the data transfer request in a packet format which is selected from a first packet format and a second packet format based on the identification, wherein the first packet format includes the attribute information and the address, and the second packet format does not include predetermined attribute information and the address, wherein the origin issuing the data transfer request is a bus master, and the identification is a number identifying the bus master from which the data transfer request is transmitted,
wherein, if the identification indicates that the bus master is a processor, the sending unit transfers the data transfer request in the first packet format, and if the identification indicates that the bus master is a direct memory access controller, the sending unit transfers the data transfer request in the second packet format.

2. The data transferring apparatus according to claim 1, further comprising a retaining unit configured to retain information for selecting the packet format from the first packet format and the second packet format.

3. The data transferring apparatus according to claim 1, wherein the data transfer request transferred in the first packet format is not a target to be compressed, and the data transfer request transferred in the second packet format is a target to be compressed.

4. The data transferring apparatus according to claim 1, wherein the processor issues the data transfer request to transfer a data executing power-saving control to or from a power-saving control module, and the data transfer request and the data executing power-saving control are transferred in the first packet format.

5. The data transferring apparatus according to claim 1, wherein the direct memory access controller issues the data transfer request to transfer an image data to or from a dynamic random access memory controller, and the data transfer request and the image data are transferred in the second packet format.

6. The data transferring apparatus according to claim 1, wherein the predetermined attribute information includes information indicating a transfer length and transfer priority, and an identification which indicates the origin from which the data transfer request is transmitted.

7. A data transferring apparatus which transfers data between a plurality of chips, comprising:
a receiving unit configured to receive a data transfer request from a plurality of origins issuing the data transfer request respectively, wherein the data transfer request includes attribute information and an address, and the address indicates a data transfer destination; and
a sending unit configured to transfer the data transfer request between the chips in a packet format which is selected from a first packet format and a second packet format based on the data transfer destination, wherein the first packet format includes the attribute information and the address, and the second packet format does not include predetermined attribute information and the address,
wherein, if the address indicates that the data transfer destination is an I/O address space, the sending unit transfers the data transfer request in the first packet format, and if the address indicate that the data transfer destination is a memory address space, the sending unit transfers the data transfer request in the second packet format.

8. The data transferring apparatus according to claim 7, wherein the data transfer request transferred in the first packet format is not a target to be compressed, and the data transfer request transferred in the second packet format is a target to be compressed.

9. The data transferring apparatus according to claim 7, wherein the predetermined attribute information includes information indicating a transfer length and transfer priority, and an identification which indicates the origin from which the data transfer request is transmitted.

10. The data transferring apparatus according to claim 7, wherein the origins issuing the data transfer request and the data transfer destination are in different chips respectively.

11. A data transferring apparatus, comprising:
a receiving unit configured to receive a data transfer request that does not include predetermined attribute information or an address, wherein the predetermined attribute information includes an identification which indicates the origin issuing the data transfer request;
an output unit configured to, based on information included in the data transfer request, output the predetermined attribute information or the address to be included in the data transfer request, wherein the output unit generates the address based on a data transfer start address and a data transfer number of repetition; and
a sending unit configured to include the predetermined attribute information or the address output by the output unit in the data transfer request and transmit the data transfer request.

12. A data transferring apparatus, comprising:
a transmission unit connected to a first bus connected to a plurality of bus masters;
a reception unit connected to a second bus connected to a bus slave;
a direct memory access controller connected to the reception unit; and
a third bus connecting the transmission unit and the reception unit,
wherein the transmission unit transfers the data transfer request in a packet format which is selected from a first packet format and a second packet format based on information included in the data transfer request issued by the bus master,
wherein the first packet format includes predetermined attribute information and an address, and the second packet format does not include the predetermined attribute information and the address, and wherein, if the data transfer request transferred from the transmission unit via the third bus is in the second packet format, the direct memory access controller outputs the predetermined attribute information and the address to the reception unit, the reception unit includes the predetermined attribute information and the address in the transfer request and transfers the transfer request to the bus slave.

13. A data transferring method, comprising:

receiving a data transfer request from a plurality of origins issuing the data transfer request respectively, wherein the data transfer request includes attribute information and an address, and the attribute information includes an identification which indicates the origin issuing the data transfer request; and transferring the data transfer request in a packet format which is selected from a first packet format and a second packet format based on the identification, wherein the first packet format includes the attribute information and the address, and the second packet format does not include predetermined attribute information and the address, wherein, the origin issuing the data transfer request is a bus master, and the identification is a number identifying the bus master from which the data transfer request is transmitted, wherein, if the identification indicated that the bus master is a processor, transferring the data transfer request in the first packet format, and if the identification indicates that the bus master is a direct memory access controller, transferring the data transfer request in the second packet format.

14. A data transferring method, comprising:

receiving a data transfer request that does not include predetermined attribute information or an address, wherein the predetermined attribute information includes an identification which indicates the origin issuing the data transfer request;

outputting, based on information included in the data transfer request received in the reception, the predetermined attribute information or the address to be included in the data transfer request, wherein the outputting comprises generating the address based on a data transfer start address and a data transfer number of repetition; and transmitting the data transfer request including the outputted predetermined attribute information or address.

15. A data transferring method, executed by a data transferring apparatus including a transmission unit connected to a first bus connected to a plurality of bus masters, a reception unit connected to a second bus connected to a bus slave, a direct memory access controller connected to the reception unit, and a third bus connecting the transmission unit and the reception unit, the data transferring method comprising:

causing the transmission unit to transfer the data transfer request in a packet format which is selected from a first packet format and a second packet format based on information included in the data transfer request issued by the bus master, wherein the first packet format includes predetermined attribute information and an address, and the second packet format does not include the predetermined attribute information and the address, and causing the direct memory access controller, if the data transfer request transferred from the transmission unit via the third bus is in the second packet format, to output the predetermined attribute information and the address to the reception unit, the reception unit includes the predetermined attribute information and the address in the transfer request and to transfer the transfer request to the bus slave.

16. A data transferring method to transfer data between a plurality of chips, comprising:

receiving a data transfer request from a plurality of origins issuing the data transfer request respectively, wherein the data transfer request includes attribute information and an address, and the address indicates a data transfer destination; and transferring the data transfer request between the chips in a packet format which is selected from a first packet format and a second packet format based on the data transfer destination, wherein the first packet format includes the attribute information and the address, and the second packet format does not include predetermined attribute information and the address, wherein, if the address indicates that the data transfer destination is an I/O address space, transferring the data transfer request in the first packet format, and if the address indicated that the data transfer destination is a memory address space, transferring the data transfer request in the second packet format.

* * * * *